United States Patent
Kwon et al.

(10) Patent No.: US 9,166,924 B2
(45) Date of Patent: Oct. 20, 2015

(54) PACKET SCHEDULING METHOD AND APPARATUS CONSIDERING VIRTUAL PORT

(71) Applicant: Electronics and Telecommunications Research Institute, Daejeon (KR)

(72) Inventors: Yool Kwon, Daejeon (KR); Eun Joo Kim, Daejeon (KR); Young Boo Kim, Chungcheongnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 176 days.

(21) Appl. No.: 13/742,924

(22) Filed: Jan. 16, 2013

(65) Prior Publication Data

US 2014/0003435 A1   Jan. 2, 2014

(30) Foreign Application Priority Data

Jun. 29, 2012 (KR) .................. 10-2012-0071135

(51) Int. Cl.
   *H04L 12/863* (2013.01)
   *H04L 12/875* (2013.01)
(52) U.S. Cl.
   CPC ............... *H04L 47/50* (2013.01); *H04L 47/56* (2013.01)
(58) Field of Classification Search
   None
   See application file for complete search history.

(56) References Cited

U.S. PATENT DOCUMENTS

| 5,862,127 | A | 1/1999 | Kwak et al. |
| 6,977,935 | B2 | 12/2005 | Kamiya et al. |
| 8,374,194 | B2 * | 2/2013 | Tanaka et al. ................. 370/458 |
| 2006/0195545 | A1 * | 8/2006 | Kikkawa et al. ............. 709/217 |
| 2007/0133561 | A1 | 6/2007 | Nam et al. |
| 2008/0056295 | A1 * | 3/2008 | Loda et al. .................... 370/437 |
| 2008/0130592 | A1 * | 6/2008 | Lee et al. ...................... 370/336 |
| 2010/0067549 | A1 * | 3/2010 | Nomura et al. ............... 370/474 |
| 2010/0103952 | A1 * | 4/2010 | Bae et al. ...................... 370/470 |
| 2010/0254407 | A1 * | 10/2010 | Tanaka et al. ................ 370/468 |
| 2011/0026405 | A1 * | 2/2011 | Takagi et al. ................. 370/235 |
| 2011/0170558 | A1 * | 7/2011 | Ye et al. ........................ 370/417 |
| 2012/0063463 | A1 * | 3/2012 | Hayashi ........................ 370/394 |
| 2013/0091041 | A1 * | 4/2013 | Sharma .......................... 705/30 |

FOREIGN PATENT DOCUMENTS

| JP | 3567878 | 9/2004 |
| KR | 1997-0009544 | 6/1997 |
| KR | 10-0542433 | 1/2006 |
| KR | 10-2007-0060552 | 6/2007 |
| KR | 10-2009-0076675 | 7/2009 |
| KR | 10-0959397 | 5/2010 |

\* cited by examiner

*Primary Examiner* — Brandon Renner
(74) *Attorney, Agent, or Firm* — Nelson Mullins Riley & Scarborough LLP

(57) ABSTRACT

In a scheduling apparatus, a packet start time with respect to an input packet is calculated, and a slot corresponding to the packet start time is selected from a scheduler including a plurality of slots. Whether to store the packet in the selected slot in consideration of the number of packets stored in the selected slot and the number of packets corresponding to virtual ports corresponding to the input packet is determined, and here, the virtual port is an output port of a switch device which is connected to the outside and does not have a scheduling function.

18 Claims, 9 Drawing Sheets

PACKET SCHEDULING METHOD AND APPARATUS CONSIDERING VIRTUAL PORT

CROSS-REFERENCE TO RELATED APPLICATION

This application claims priority to and the benefit of Korean Patent Application No. 10-2012-0071135 filed in the Korean Intellectual Property Office on Jun. 29, 2012, the entire contents of which are incorporated herein by reference.

BACKGROUND OF THE INVENTION (a) Field of the Invention

The present invention relates to a packet scheduling method and apparatus and, more particularly, to a method and apparatus for performing packet scheduling in consideration of a port of a different switch, as a virtual port.

(b) Description of the Related Art

As wireless Internet services have been activated, wireless Internet traffic has been rapidly increased. A wireless communication resource is limited in a bandwidth of a public frequency, and thus, in order to accommodate fast-growing traffic, communication resources are required to be expanded and supplemented, for example, additional installation of base stations and the like.

Supplement of communication resources through expansion of base stations and the like is fit to further accommodate low-quality best effort service traffic such as Internet traffic, but causes a problem accommodating high-quality traffic such as voice communication or the like. That is, due to a great amount of Internet traffic, voice traffic is delayed to cause voice communication to be cut off, and the like. Thus, in a wireless access network in which wireless Internet traffic and voice traffic are mixedly used and transferred together, traffic scheduling is required, namely, quality of traffic should be classified according to types of traffic, and high-quality real time traffic such as voice communication should be preferentially transferred.

However, a small packet switch installed in an existing base station does not have a scheduling function based on quality grade, so there is a difficulty in replacing small packet switches of numerous base stations with packet switches having a scheduling function in order to enhance communication quality.

In addition, an existing scheduling apparatus performs packet scheduling according to a service grade in a switch system, complying with quality of communication service, but when it interworks with a packet switch without a scheduling function, communication quality is drastically degraded overall. Thus, in order to control communication quality on the whole, all switches connected are required to have a function of scheduling traffic according to a service type, making it difficult to manage quality.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a scheduling method and apparatus having advantages of performing communication by a packet switch of a core network in real time by transferring traffic to a subscriber according to a quality of service (QoS) grade in consideration of a packet switch port of a base station although a packet switch of the base station does not have a scheduling function.

An exemplary embodiment of the present invention provides a scheduling method including: obtaining a session identifier from a header of an input packet and storing the packet in a packet memory; calculating a packet start time of the packet; selecting a slot corresponding to the packet start time from a scheduling including a plurality of slots; determining whether to store the session identifier of the input packet in the selected slot in consideration of the number of session identifiers already stored in the selected slot and the number of session identifiers representing virtual ports corresponding to the input packet, the virtual port being an output port of a switch device which is connected to the outside and does not have a scheduling function; and when the session identifier is determined to be stored with respect to the selected slot, storing the session identifier in the selected slot, and when the start time of the packet arrives, reading the packet stored in the packet memory by using the stored session identifier and outputting the same. The storing of the packet may include: reading the corresponding session identifier present in the head of the input packet; obtaining a characteristic parameter corresponding to the session identifier; and storing the packet in the packet memory by using the characteristic parameter.

The characteristic parameter may include a service bandwidth as an allowable bandwidth of a session, a service type, the number of packets indicating the number of packets corresponding to the session has passed, a number of an output port in which a packet is transferred, a virtual port number as a number of a next output port in which a packet is further to be transferred, and a session start address and a session end address of a packet memory in which packets corresponding to the session are stored in a linked list manner.

The storing of the packet in the packet memory may include storing of the input packet in the packet memory based on the session start address and the session end address of the packet memory included in the characteristic parameter.

The calculating of the packet start time may include calculating a start time of the packet based on a bandwidth of session and a service type item of the characteristic parameter.

In the determining, whether to store the session identifier of the input packet in the selected slot may be determined in consideration of a counter value of a first packet counter indicating the number of session identifiers stored in the slot and a counter value of a second packet counter indicating the number of session identifiers corresponding to virtual ports corresponding to the input packet among session identifiers stored in the slot.

The determining may include: updating the counter value of the first packet counter; comparing the updated counter value of the first packet counter with a first maximum value previously set with respect to the slot; and when the updated counter value of the first packet counter is smaller than the first maximum value, storing the session identifier of the input packet in the selected slot.

The determining may further include, when the updated counter value of the first packet counter is greater than the first maximum value, returning the updated counter value of the first packet counter to a previous value before being updated, and selecting a slot corresponding to a next turn from among the slots of the scheduler.

The determining to store the session identifier may include: updating the counter value of the second packet counter; comparing the updated counter value of the second packet counter with a pre-set second maximum value with respect to the virtual ports; and when the updated counter value of the second packet counter is smaller than the second maximum value, storing the session identifier of the input packet in the selected slot.

The determining to store the session identifier may further include, when the updated counter value of the second packet counter is greater than the second maximum value, returning the updated counter value of the second packet counter to a previous value before being updated, and selecting a slot corresponding to a next turn from among the slots of the scheduler. The second maximum value may be determined based on a bandwidth of the virtual port.

The outputting of a packet may include: designating a slot in which the session identifier of a packet to be started at a current time is stored, as a current slot; checking whether or not a session identifier is stored in the current slot, a previous slot of the current slot, and a previous slot of the previous slot in the scheduler; when there is a session identifier in the current slot, a previous slot of the current slot, and a previous slot of the previous slot, selecting the session identifier of a packet to be output based on a weight given to buffers included in respective slots, and outputting the selected session identifier; and reading a corresponding packet stored in the packet memory by using the session identifier and outputting the packet.

Another embodiment of the present invention provides a scheduling apparatus including: a scheduling unit including a plurality of slots and performing scheduling to selectively store a session identifier of a slot corresponding to a packet start time in consideration of the number of session identifiers stored in the slot and the number of session identifiers representing virtual ports corresponding to an input packet, the virtual port being an output port of a switch device which is connected to the outside and does not have a scheduling function; and an output buffer unit reading a packet corresponding to the session identifier stored in the slot corresponding to the packet start time from a packet memory and outputting the same.

Each of the slots may include: a first packet counter indicating the number of packets stored in each slot; a second packet counter indicating the number of packets corresponding to each virtual port; and a plurality of buffers storing a corresponding session identifier according to each service type, wherein the plurality of buffers may be given a different weight according to a service type.

The scheduling unit may update a counter value of the first packet counter corresponding to the slot corresponding to the packet start time, and when the updated counter value is smaller than a first maximum value previously set with respect to the slot, the scheduling unit may store the session identifier of the packet in the slot.

The scheduling unit may update a counter value of the second packet counter corresponding to the slot corresponding to the packet start time, and when the updated counter value is smaller than a second maximum value previously set based on a bandwidth of the virtual port, the scheduling unit may store the session identifier of the packet in the slot.

When the updated counter value of the first packet counter is greater than the first maximum value or when the updated counter value of the second packet counter is greater than the second maximum value, the scheduling unit may return the updated counter value to a previous value before being updated and select a slot corresponding to a next turn from among the plurality of slots.

Meanwhile, when session identifiers are stored in respective buffers of a current slot as a slot in which a session identifier of a packet to be started at a current time is stored, a previous slot of the current slot, and a previous slot of the previous slot, the scheduling unit may select a session identifier to be output based on weights given to the buffers included in the respective slots and output the selected session identifier.

The output buffer unit may include a plurality of buffers, and the plurality of buffers may be discriminated according to service types and may be given weights according to service types. The buffers according to service types may be discriminated into buffers according to output ports, the same weight may be given to the output ports, and when one of a plurality of buffers is selected and a session identifier stored therein is output, a corresponding packet may be read from the packet memory by using the session identifier, and a packet may be finally output.

DETAILED DESCRIPTION OF THE EMBODIMENTS

Figure 1:
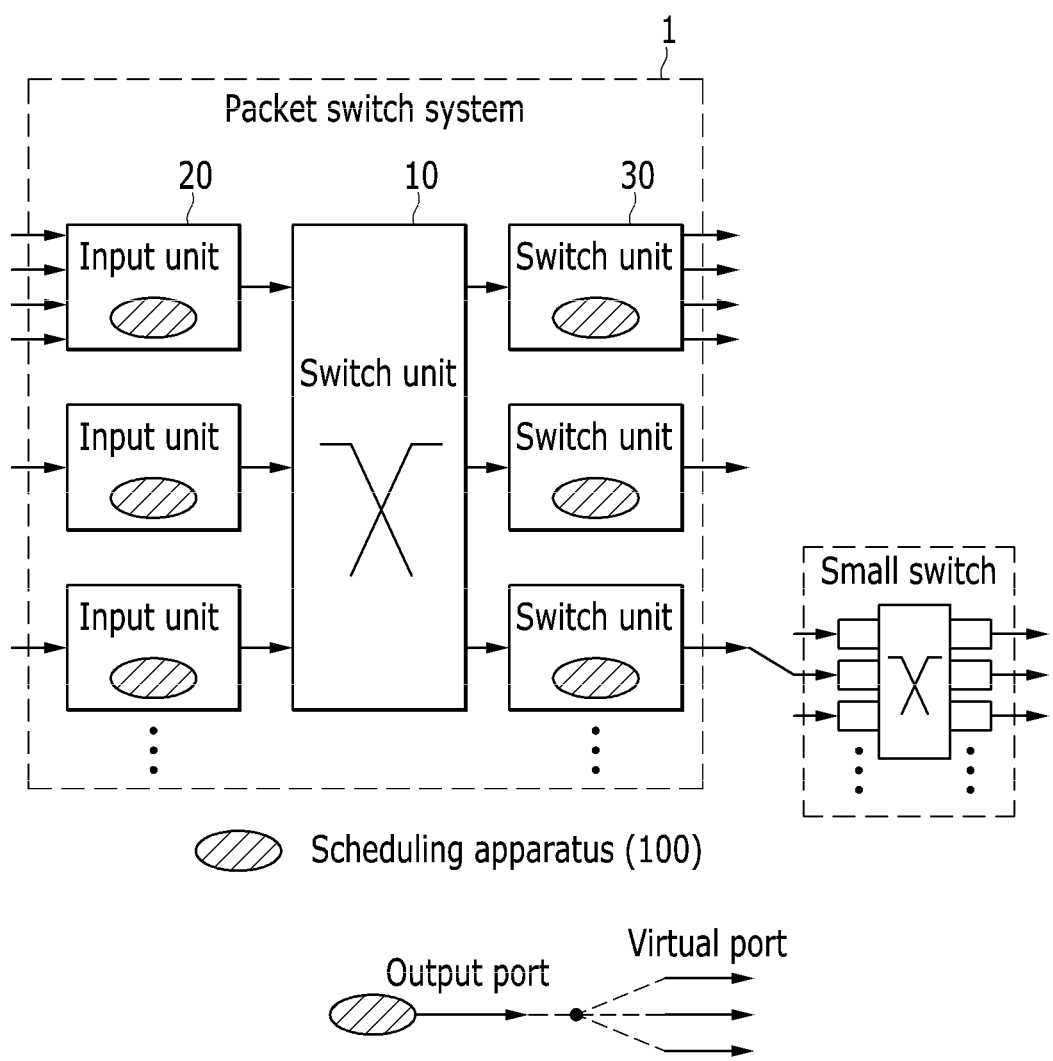
FIG. 1 is a view illustrating a structure of a packet switch system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A scheduling method and apparatus according to embodiments of the present invention will be described in detail with reference to the accompanying drawings.

In an embodiment of the present invention, an input packet is scheduled in consideration of a bandwidth of a virtual output port as well as a switch output port. Here, a virtual output port refers to an output port of an external different switch desired to be controlled.

FIG. 1 is a view illustrating a structure of a packet switch system according to an embodiment of the present invention.

As illustrated in FIG. 1, a packet switch system 1 according to an embodiment of the present invention includes a switch unit 10, a plurality of input units 20, and a plurality of output units 30.

The plurality of input units 20 receive a plurality of packets and provide the received packets to the switch unit 20, and the switch unit 10 processes the packets provided from the respective input units 20 and provides the same to at least one of the plurality of output units 30.

The packet switch system 1 having the foregoing configuration includes a packet scheduling apparatus, namely, a scheduling apparatus 100. The scheduling apparatus 100 may be included in the input units 20 of the packet switch system 1 or included in the output units 30. Alternatively, the scheduling apparatus 100 may be included in both of the input units 20 and the output units 30.

When the input unit 20 includes the scheduling apparatus 100, the input unit 20 as an interface module performs scheduling on the packet according to characteristics thereof before sending the packet to the switch unit 10. Also, when the output unit 30 includes the scheduling apparatus 100 and has a plurality of physical output ports, the output unit 30 as an interface module performs scheduling on packet traffic according to bandwidths of the respective physical output ports.

The scheduling apparatus 100 according to an embodiment of the present invention may interwork with an external switch not having a scheduling function to perform scheduling on packet traffic according to quality of service (QoS). When the scheduling apparatus 100 interworks with an external switch not having a scheduling function in a state in which the scheduling apparatus 100 is located in a core network, the scheduling apparatus 100 processes an output port of the external switch, as a virtual port, and perform scheduling on packet traffic in consideration of a bandwidth of the virtual port. Therefore, degradation of communication quality otherwise occurring because traffic is not controlled in interworking with an external switch not having a scheduling function can be prevented.

Figure 2:
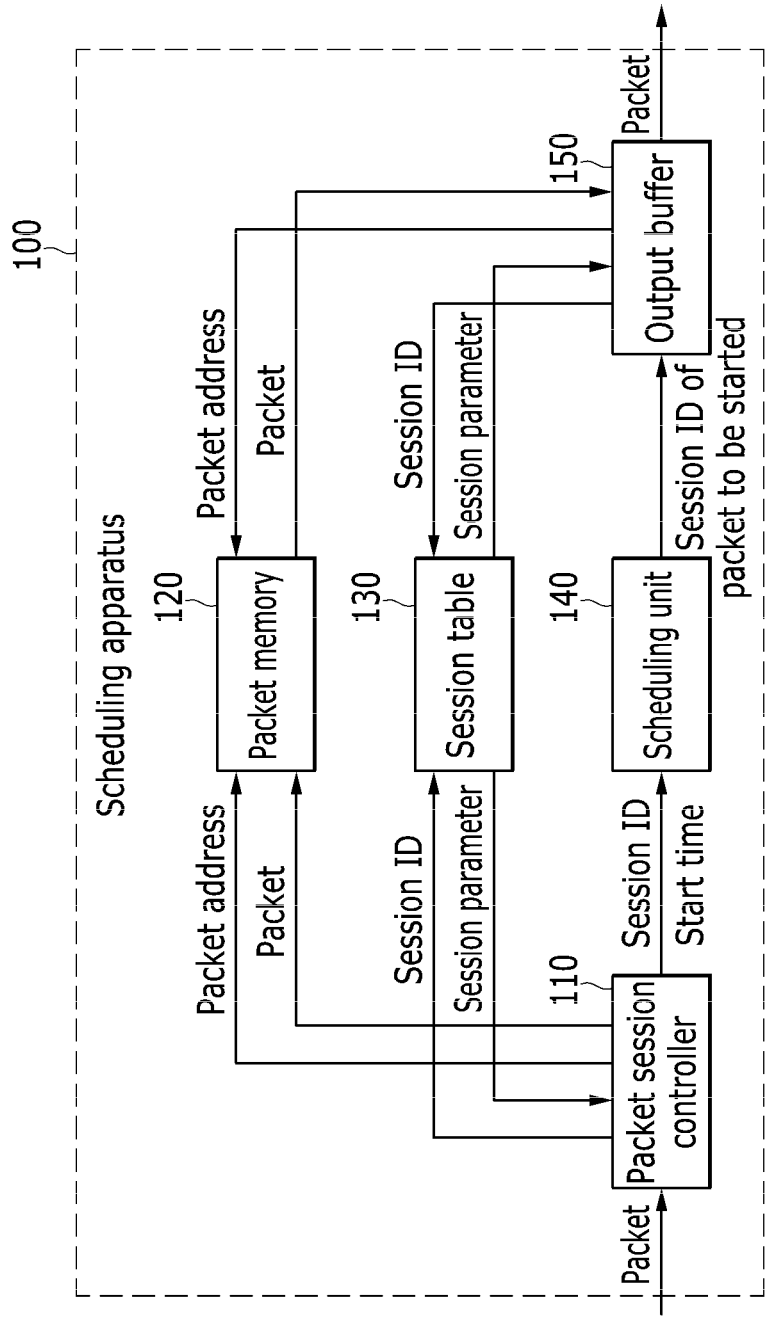
FIG. 2 is a view illustrating a structure of a scheduling apparatus according to an embodiment of the present invention.

FIG. 2 is a view illustrating a structure of a scheduling apparatus according to an embodiment of the present invention.

As illustrated in FIG. 2, the scheduling apparatus 100 according to an embodiment of the present invention includes a packet session controller 110, a packet memory 120, a session table 130, a scheduling unit 140, and an output buffer unit 150.

The packet session controller 110 determines a start time of an input packet based on a characteristic parameter of a session to which the input packet belongs. The packet session controller 110 obtains a characteristic parameter of a session from the session table 120 based on an identifier, i.e., a session ID, of the session, and determines a start time of the input packet based on the obtained characteristic parameter.

The packet memory 120 stores the packet, and in particular, the packet memory 120 stores the packet in a linked list manner. The packet memory 120 stores the packet transferred from the packet session controller 110, and packets of each session are sequentially stored in the packet memory 120.

When a start time of a stored packet arrives, the output buffer unit 150 reads it.

Figure 3:
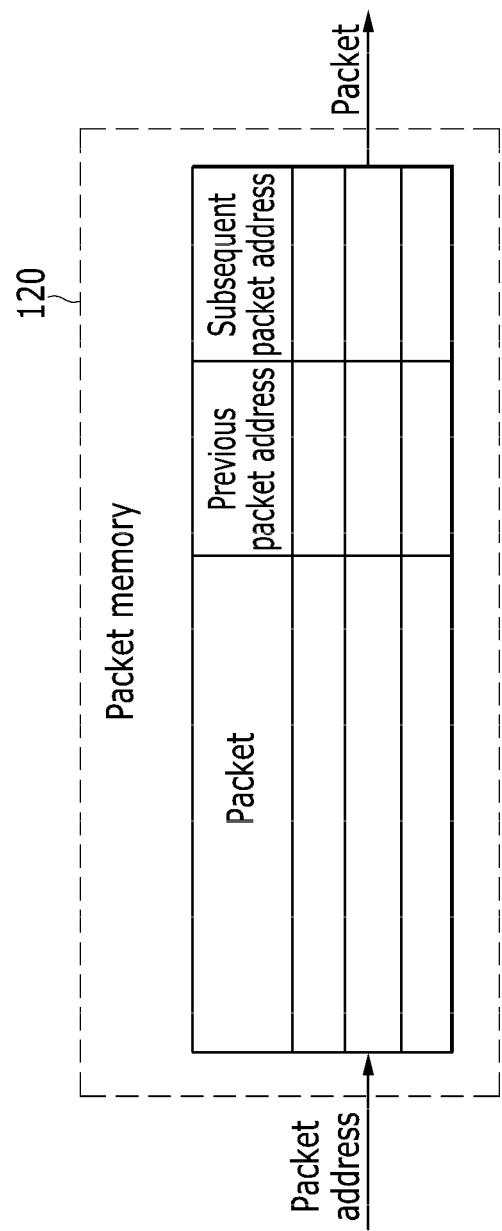
FIG. 3 is a view illustrating a structure of a packet memory according to an embodiment of the present invention.

FIG. 3 is a view illustrating a structure of a packet memory according to an embodiment of the present invention. As illustrated in FIG. 3, the packet memory 120 stores a packet, an address of a packet which has first come is stored, and then an address of a subsequent packet is stored.

Figure 4:
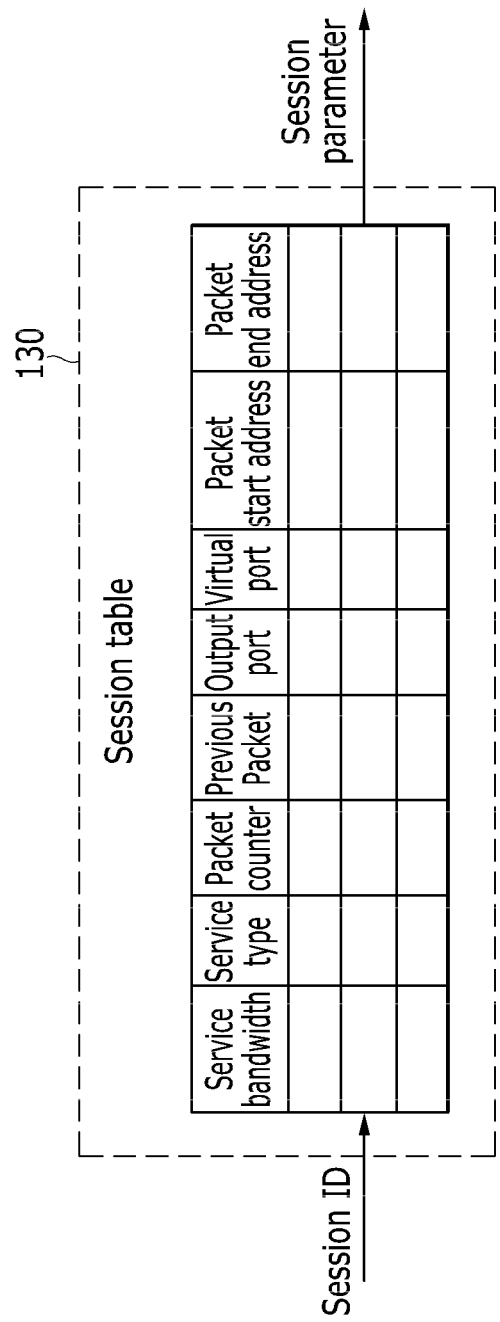
FIG. 4 is a view illustrating a structure of a session table according to an embodiment of the present invention.

The session table 130 stores characteristic parameters of respective sessions to which packets belong. FIG. 4 is a view illustrating a structure of a session table according to an embodiment of the present invention. As illustrated in FIG. 4, the session table 130 stores characteristic parameters of sessions corresponding to IDs of respective sessions. The characteristic parameters include a service bandwidth as an allowable bandwidth of a session, a service type, the number of packets indicating packets corresponding to a session have passed, an output port number in which a packet is transferred, a virtual port number as a next output port number in which a packet is to be further transferred, a packet start address and a packet end address in which packets corresponding to the session are stored in a linked list manner in the packet memory 120, and the like.

Here, when the scheduling apparatus 100 is located in the input unit 20 of the packet switch system 10, the output port number may represent an output port of the switch unit 10, and a virtual output port number may represent an output port of a small switch which does not have a scheduling function and is connected to the output unit 30.

The scheduling unit 140 schedules packets in consideration of virtual ports, and performs packet scheduling such that packets can be delivered to the output ports at a packet start time determined by the packet session controller 110.

In order to maintain communication quality when performing scheduling, the scheduling unit 140 discriminates traffic into high-quality real time traffic, high-quality non-real time traffic, low-quality real time traffic, and low-quality non-real time traffic according to types of communication services, and processes packets according to the discriminated levels of quality. For example, a voice call service corresponds to high-quality real time traffic, and an Internet service refers to low-quality non-real time traffic.

When the packet is input, the scheduling unit 140 performs scheduling such that the corresponding packet may start according to a start time of the packet. With respect to non-real time traffic, the scheduling unit 140 processes the corresponding packet such that it may immediately start, and when packets which have not started yet and delayed are stored, the scheduling unit 140 stores the corresponding packet behind the delayed packets and performs scheduling such that the front delayed packets first start and the corresponding packet subsequently starts.

In this manner, the scheduling unit 140 that controls a start time of packets may be configured as a calendar type scheduler that controls a start time of packets in consideration of a bandwidth of a virtual output port.

Figure 5:
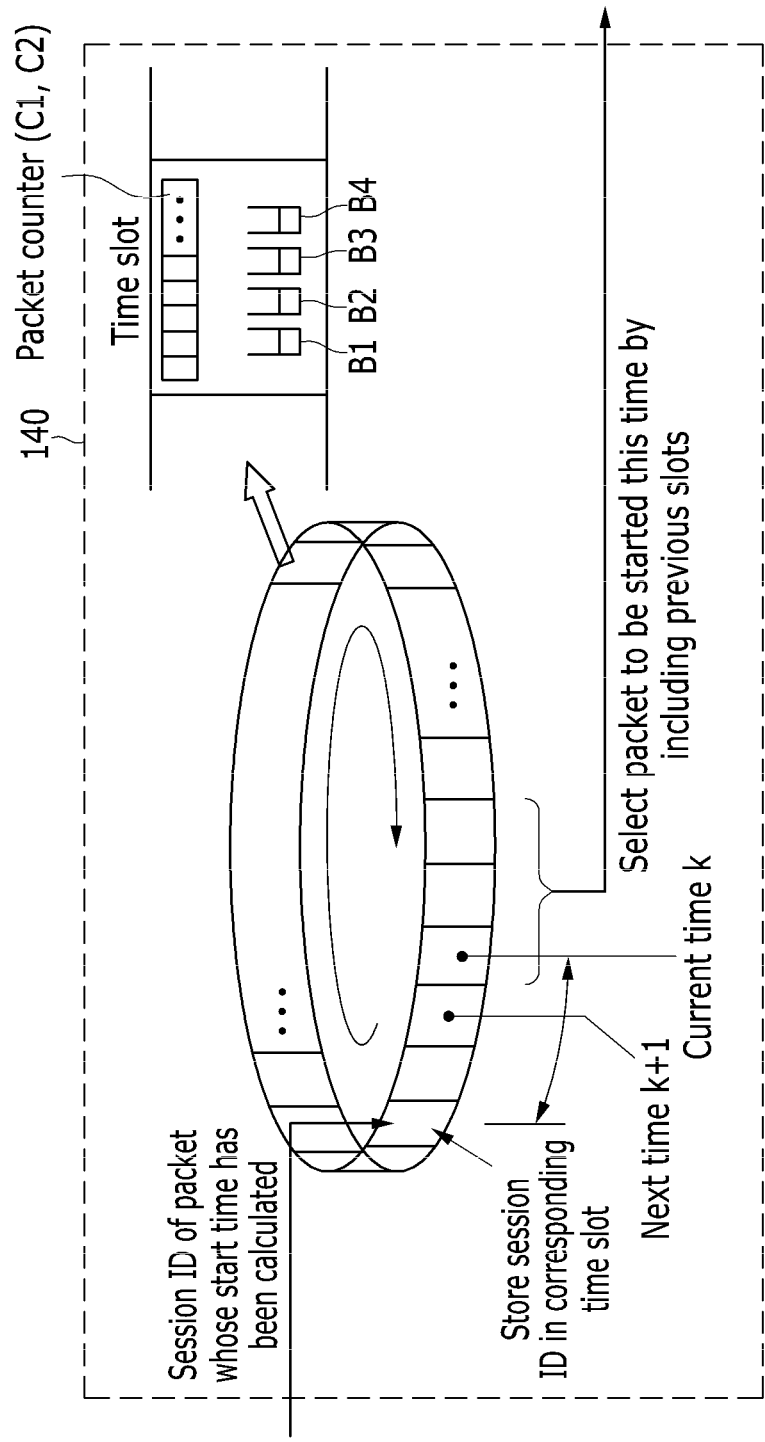
FIG. 5 is a view illustrating a structure of a scheduling unit according to an embodiment of the present invention.

FIG. 5 is a view illustrating a structure of the scheduling unit according to an embodiment of the present invention.

As illustrated in FIG. 5, the scheduling unit 140 may be configured as a calendar type scheduler. The scheduling unit 140 includes a plurality of time slots t1, t2, . . . , tn, and each slot includes a plurality of buffers B in which session IDs of packets are stored, a packet counter C1 indicating an amount or the number of session IDs stored in the slots, and a packet counter C2 indicating an amount or the number of session IDs of each virtual port.

Here, the packet counter C1 indicating an amount or the number of session IDs stored in the slots counts the number of session IDs stored in the corresponding slots. The packet counter C2 of a virtual port indicates an amount or the number of (referred to as the "number" hereinafter) of stored session IDs of packets output to a pertinent virtual port among session IDs stored in the pertinent slot. The number of a virtual port corresponding to a session can be known from a characteristic parameter obtained from the session table. Based on a value of the counter, the number of packets to be output to a certain virtual port are stored in the slots can be known, and session IDs of packets may be stored in pertinent slots to fit a maximum allowable value of virtual ports.

Each slot of the scheduling unit 140 corresponds to a start time of the session ID, and the scheduling unit 140 is provided with a start time of a packet and an ID of a corresponding session from the packet session controller 110 and stores a session ID of a slot corresponding to the start time of the packet. That is, the scheduling unit 140 may store a session ID of a packet in a slot corresponding to a start time of the input packet. The session IDs stored in the slots sequentially start according to order of the slots. For example, when a current time is k, a session ID stored in a kth slot starts, a session ID stored in a (k+1)th time slot starts at a next time, and a session ID stored in a (k+2)th time slot starts at a next time.

Meanwhile, each slot includes the buffer B. A plurality of buffers B are provided according to service types, and operate according to FIFO (first-in first-out). Here, as discussed above, for example, the service types are classified into the four types: high-quality real time traffic, high-quality non-real time traffic, low-quality real time traffic, and low-quality non-real time traffic. When there are four service types, each slot includes four buffers B1, B2, B3, and B4 as shown in FIG. 5. Based on a service type obtained from the characteristic parameter of the session of the input packet, a corresponding session ID is stored in a buffer corresponding to the service type among the plurality of buffers of the slot corresponding to the start time of the packet. Different weights are given according to importance thereof by service types, and weights according to importance of services are given to the respective buffers B1, B2, B3, and B4, and the session IDs stored in the respective buffers are output according to a weight round robin (WRR) method.

Figure 6:
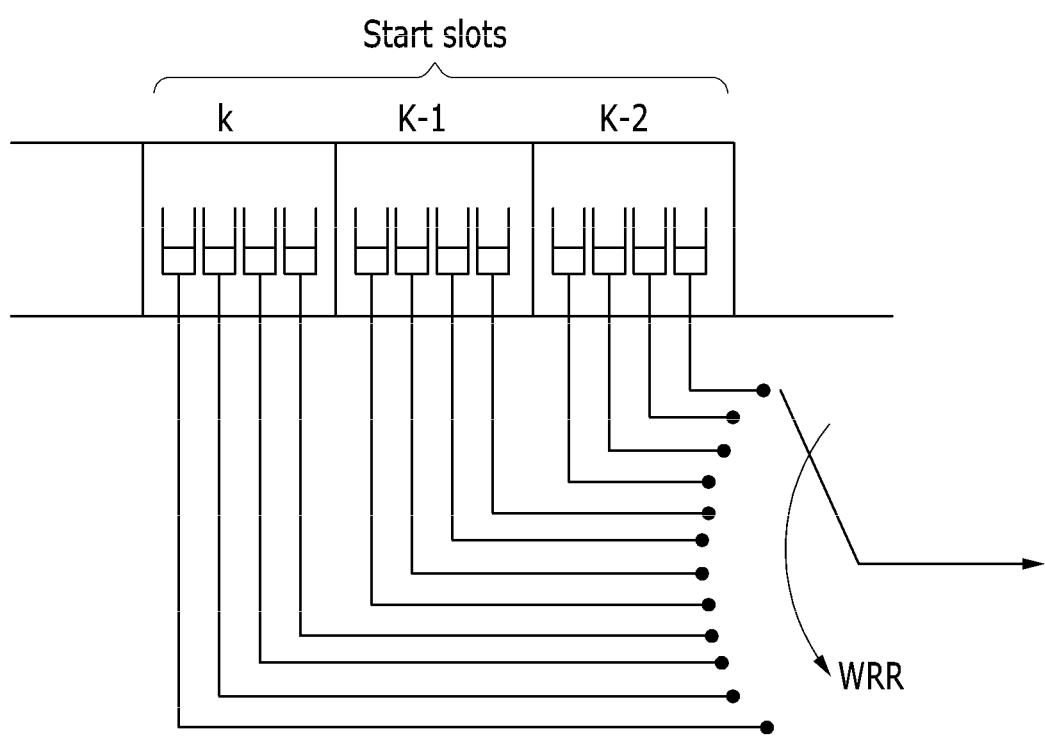
FIG. 6 is an exemplary view illustrating a process of starting a packet in the scheduling unit according to an embodiment of the present invention.

FIG. 6 is an exemplary view illustrating a process of starting a packet in the scheduling unit according to an embodiment of the present invention.

According to which service type pertinent traffic corresponds to, a session ID of an input packet is stored in a buffer corresponding to the service type among a plurality of buffers of the slot corresponding to the start time, in a FIFO manner. As illustrated in FIG. 6, when starting, a session ID stored in a buffer having a higher weight is first output according to the WRR method. In detail, in a state in which session IDs are stored in the FIFO manner in the buffers of the kth, (k−1)th, and (k−2)th slots, a session ID to start at a current time according to the WRR method is determined based on the weights given to the respective buffers.

Meanwhile, the stored session IDs may not start at the corresponding start time, i.e., the (k−2) time or (k−1) time, due to a large amount of session IDs stored in the (k−1)th or the (k−2)th slot. In preparation for this case, the scheduling unit 140 checks whether or not there is a session ID remaining in the previous slots, e.g., the (k−2)th slot and the (k−1)th slot, before starting the session ID of the kth slot at the time k. When there is a session ID remaining in the previous time slots according to the checking, the scheduling unit 140 starts the remaining session IDs.

Meanwhile, since each slot includes the packet counter C1 indicating the number of session IDs stored in the slots and the packet counter C2 indicating the number of session IDs stored in each virtual port, an amount of session IDs stored in the slots and an amount of session IDs stored for each virtual port can be easily known based on the counters. The scheduling unit 140 updates the packet counter C1 of slots and the packet counter C2 for each virtual port, while storing the session IDs of each slot. When a counter value of the packet counter C1 of slots is greater than a pre-set available maximum storage value of the slots, the scheduling unit 140 determines that the session ID cannot be stored in the corresponding slot, and returns the counter value of the corresponding packet counter C1 to the original value, namely, the value before updating the counter value. Also, the session ID is stored in a next slot. Further, when a counter value of the packet counter C2 for each virtual port is greater than an output allowable value previously set according to a bandwidth of a corresponding virtual port, the scheduling unit 140 determines that the session ID cannot be stored in the corresponding slot, and returns the counter value of the corresponding packet counter C2 to the original value. Also, the session ID is stored in a next slot.

In the scheduling unit 140 having the foregoing configuration, when a corresponding start time arrives, the stored session ID is output. As one slot moves at every unit time in the scheduling unit 140, the corresponding slot is designated as a start slot, and a session ID stored in the slot is output. Here, there may be a previous slot having a session ID which was designated as a start slot beforehand but has not been started due to congestion of a next stage. Since the session IDD present in the slot should be first output, the session ID of the slot may be considered to have a higher priority level than a current start slot. In an embodiment of the present invention, a session ID to be started may be searched according to a WRR method by giving different weights to respective buffers of a previous slot and a previous slot of the previous slot and respective buffers of the current slot.

Figure 7:
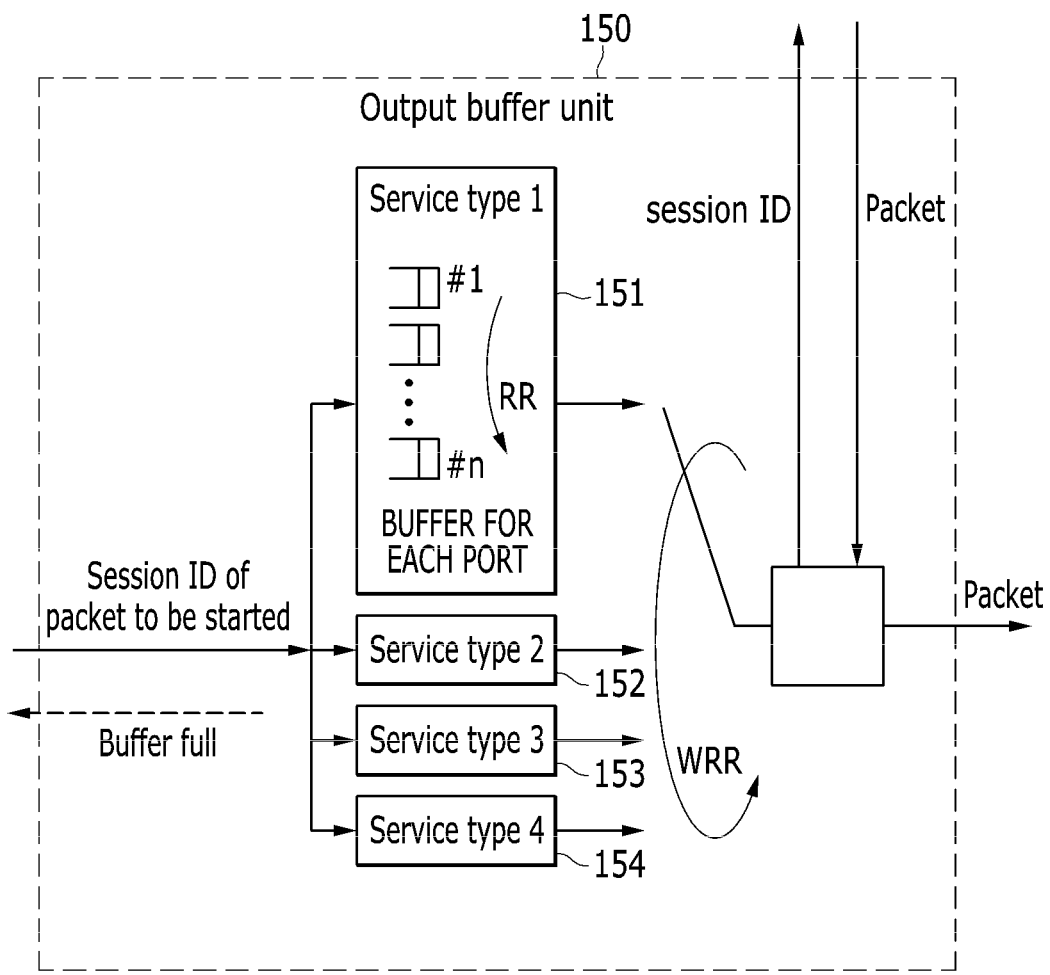
FIG. 7 is a view illustrating a structure of an output buffer unit according to an embodiment of the present invention.

Meanwhile, when the output buffer unit 150 receives a session of a packet from the scheduling unit 140, it performs scheduling again according to the characteristics of output ports to select a session ID to be output, reads a packet corresponding to the session ID from the packet memory, and outputs the same. FIG. 7 is a view illustrating a structure of the output buffer unit according to an embodiment of the present invention. The output buffer unit 150 includes a plurality of buffers according to service types. Here, there are four service types, so a case in which the output buffer unit 150 includes four buffers 151, 152, 153, and 154 is illustrated as an example.

Weights according to service types are given to the respective buffers 151, 152, 153, and 154, and weights vary according to importance of service types. Thus, the session IDs stored in the respective buffers 151, 152, 153, and 154 are output according to the WRR method.

The respective buffers 151, 152, 153, and 154 may include buffers *1, . . . , #n for each port. Substantially, buffers *1, . . . , #n discriminated for each output port to which packets are to be output are included in the respective buffers 151, 152, 153, and 154, and the buffers *1, . . . , #n for each output port may be output according to a round robin (RR) method.

Here, the output ports as virtual ports may correspond to output ports of the switch unit 10 or to the output ports of the output unit 30. When the scheduling apparatus 100 is positioned in the input unit 20 of the packet switch system 10, the output port corresponds to an output port of the switch unit 10.

In an embodiment of the present invention, an output port of the switch unit 10 is used as a virtual port, and packets are output by using a virtual output queue (VOQ) corresponding to the virtual port. Here, respective buffers of the output buffer unit 150 serve as virtual output buffers corresponding to a virtual port. When traffic of the switch unit 10 is congested, the respective buffers of the output buffer unit 150 serving as virtual output buffers keep a packet in storage rather than sending it to the switch unit 10, and when the traffic is not congested, the respective buffers send the packet to the output ports of the switch unit 10.

Meanwhile, when the scheduling apparatus 100 is positioned in the output unit 30 of the packet switch system 1 and the output unit 30 has several low-speed output ports, the output unit 30 includes a buffer for adjusting speed to the low-speed output port. When packets are not output from the buffer of the output unit 30, the buffer is continuously filled, and when the buffer cannot be filled any further, a back pressure (BP) signal for requesting not to send a packet is transmitted to the scheduling apparatus 100. Upon receiving the BP signal, the scheduling apparatus 100 simply stores a packet in a slot of the scheduling unit 140 rather than sending it to an output port, and sends it to the output port at a time corresponding to a next slot.

A packet scheduling method according to an embodiment of the present invention based on the foregoing structure will now be described.

Figure 8:
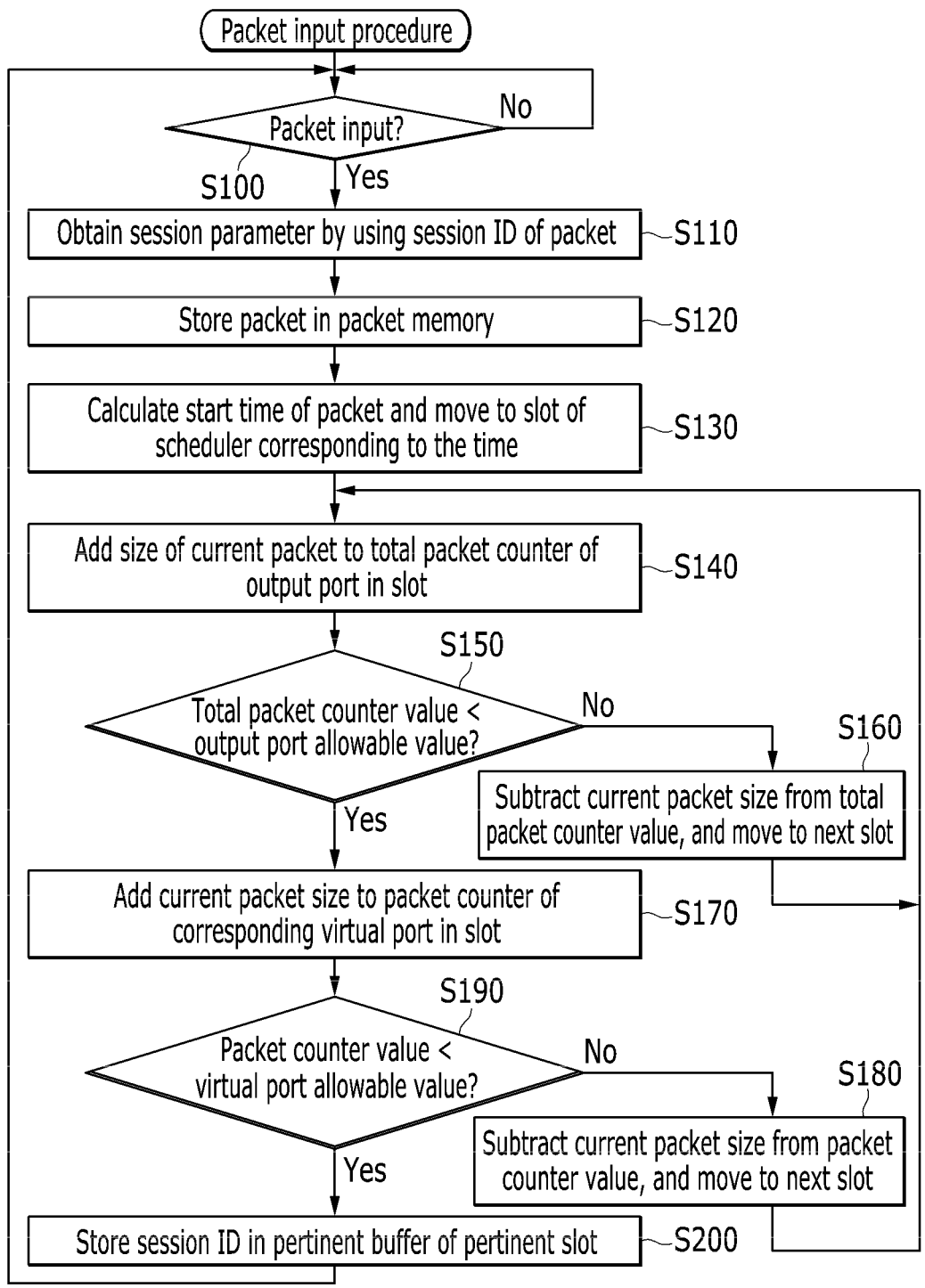
FIGS. 8 and 9 are flowcharts illustrating a scheduling method according to an embodiment of the present invention.
Figure 9:
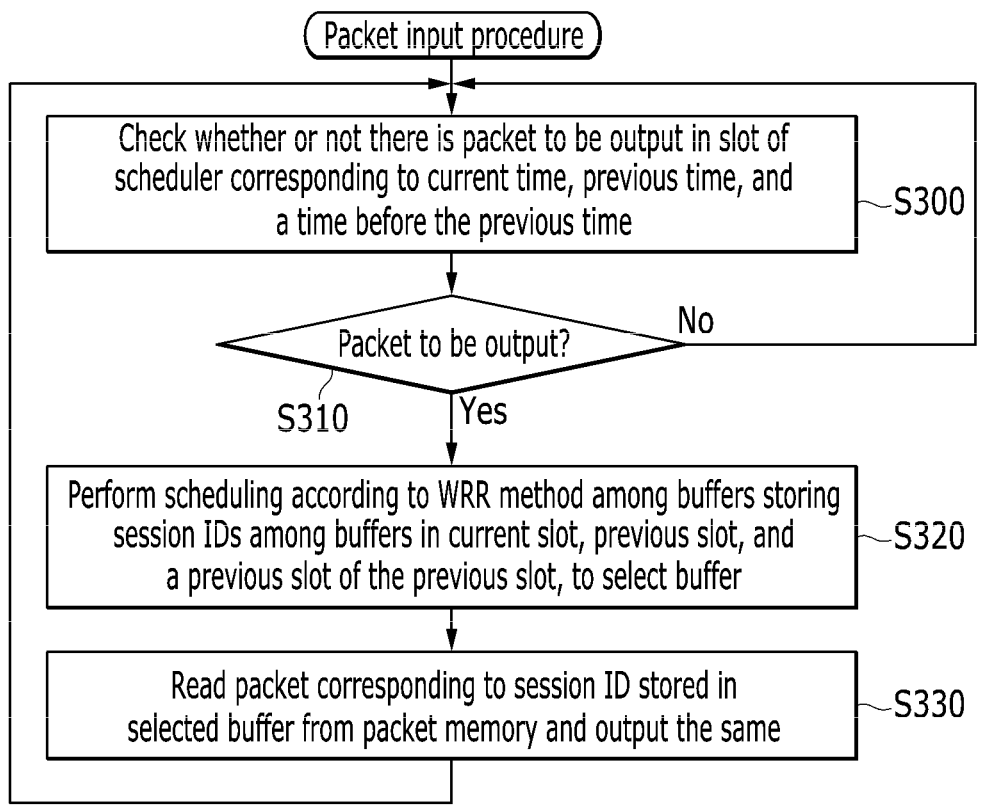

FIGS. 8 and 9 are flowcharts illustrating a scheduling method according to an embodiment of the present invention. Specifically, FIG. 8 illustrates a packet scheduling method for inputting a packet to a scheduling apparatus, and FIG. 9 illustrates a packet scheduling method for outputting a packet stored in the scheduling apparatus.

Here, a case in which the scheduling apparatus 100 is implemented to be included in the input unit 20 of the packet switch system 1 will be described as an example. Thus, an output port of the scheduling apparatus 100 corresponds to an output port of the switch unit 10, and the output port of the switch unit 10 is processed as a virtual port and packet scheduling is performed.

As illustrated in FIG. 8, when a packet is input, the packet session controller 110 of the scheduling apparatus 100 determines a start time of the corresponding packet (S100). In detail, the packet session controller 110 extracts a session ID to which the packet belongs from a header of the input packet, and obtains a characteristic parameter of a session from the session table 130 by using the session ID (S110). The packet session controller 110 stores the packet of the corresponding session in the packet memory 120 based on a packet start address and a packet end address included in the characteristic parameter (S120).

The packet session controller 110 measures a bandwidth of the session to which the packet belongs, and compares the measured bandwidth with a pre-set allowable bandwidth of the session to calculate a start time of the packet. When a bandwidth of the session is measured, a GCRA (generic cell rate algorithm) method may be used. Besides the bandwidth of the session, a bandwidth may be measured in units of output ports. The packet session controller 110 calculates a start time as a time at which the packet should start, based on the measured bandwidth of the session, a bandwidth of each output port, and the characteristic parameter of the session (S130). In the GCRA method, when the session is a real-time service, the bandwidth of the session is set by a value determined in contract with a subscriber, but in case of a non-real time service or in case of a best effort service (a low-quality non-real time service), a determined value may be applied to the bandwidth according to an operation policy. For example, when the measured bandwidth value of the session is greater than a pre-set value, the excessive packets are discarded or allowed to pass according to an operation policy.

When a packet start time is determined by the packet session controller 110, the scheduling unit 140 checks a slot corresponding to a start time of the input packet. To this end, the scheduling unit 140 updates a counter value of the packet counter C1 of the slot in which the session ID of the packet is stored (S140).

The scheduling unit 140 determines whether or not a session ID can be stored in a corresponding slot based on updated counter values of the packet counter C1. In detail, the scheduling unit 140 compares a counter value of the packet counter C1 indicating an amount of session IDs stored in the slots with a maximum value (which is an output port allowable value as an amount of session IDs allowable in an output port corresponding to slots) that can be stored in slots (S150). When the counter value of the packet counter C1, namely, the counter value indicating the total number of session IDs stored in the current slot, is greater than the maximum value, the scheduling unit 140 determines that a session ID cannot be stored in the corresponding slot. Also, the scheduling unit 140 returns the counter value of the packet counter C1 to the original value before being updated, and checks whether or not it can be stored in a next slot (S160). This process is repeatedly performed, and a slot in which a total number of session IDs stored in a slot is smaller than a maximum value with respect to the corresponding slot is selected.

Meanwhile, in step S150, when the counter value indicating the total number of session IDs stored in the current slot is smaller than the maximum value, the scheduling unit 140 updates the counter value of the packet counter C2 of a virtual port of the current slot (S170). Also, the scheduling unit compares the counter value of the packet counter C2 corresponding to the virtual port with a pre-set maximum value of the virtual port, namely, an allowable value of the virtual port corresponding to a maximum value of the session IDs that can be processed in the virtual port corresponding to the slot (S180). According to the comparison result, even when the counter value of the packet counter C2 of the virtual port is greater than the allowable value of the virtual port, the scheduling unit 140 determines that the session ID cannot be stored in the corresponding slot. Also, the scheduling unit 140 returns the counter value of the packet counter C2 to the original value before being updated, and checks whether or not it can be stored in a next slot (S190). This process is repeatedly performed, and a slot in which a total number of session IDs stored according to a virtual port is smaller than the maximum value with respect to the corresponding virtual port is selected.

When a slot in which the total number of session IDs stored in the slot is smaller than the maximum value with respect to the corresponding slot and the total number of session IDs stored according to the virtual port is also smaller than the maximum value with respect to the corresponding virtual port is finally checked, the scheduling unit 140 stores the session ID in the finally checked slot. That is, the scheduling unit 140 stores the session ID of the corresponding packet in the buffer corresponding to the service type of the corresponding slot (S200). A process of outputting a session IDD stored in the scheduling apparatus will now be described.

As described above, in a state in which a session ID is stored in a slot of the scheduling unit 140 of the scheduling apparatus 100, when a current time corresponds to a start time of the session ID, the session ID stored in the corresponding slot is output.

In detail, while slots are moved at every unit time one by one, a corresponding slot is designated as a start slot, and a session ID stored in the slot is output. At this time, there may be a previous slot having a session ID which was designated as a start slot beforehand but has not been started due to congestion of a next stage. Because the session ID in the slot should be first output, the session ID of the slot is considered to have a higher priority level than that of the current start slot. Thus, as shown in FIG. 9, the scheduling unit 140 checks slots corresponding to a current time, a previous time, and a previous time of the previous time to determine whether or not there is a session ID to be started. That is, when session IDs of packets to be started in a slot designated as a slot which has currently started, a previous slot of the designated slot and a previous slot of the previous slot are stored, the scheduling unit 140 searches a session ID to be started according to the WRR method among the buffers B1, B2, B3, and B4 storing the corresponding session IDs. That is, based on weights corresponding to respective buffers, the scheduling unit 140 determines which of buffers a session ID stored therein is to be output, and outputs the session ID stored in the corresponding buffer according to determined order.

The session ID stored in the buffer searched according to the WRR method is output to the output buffer unit 150, and the output buffer unit 150 reads a packet stored in the packet memory 120 based on the session IDD output from the scheduling unit 140 and outputs the same. That is, the packet read from the packet memory 120 by using the session ID is finally output from the scheduling apparatus 100 through the output buffer unit 150.

Through this process, according to embodiments of the present invention, the scheduling apparatus performs scheduling on packet traffic according to QoS of a session, and when interworking with an external device that does not have a scheduling function, the scheduling apparatus can perform scheduling in consideration of an output port of the device, as a virtual output port. Thus, even in a wireless access network including small switches which do not have a scheduling function overall, scheduling can be performed in consideration of communication resource by using the scheduling apparatus according to an embodiment of the present invention, and thus, an economical wireless access network can be configured.

According to embodiments of the present invention, since a packet switch existing in a core network, in the place of a packet switch of a base station, schedules traffic according to a band situation of the base station and transfers a packet to the base station, the packet switch of the base station may be able to transfer traffic to a subscriber according to a QoS class even without a scheduling function, in spite of traffic congestion, so the subscriber can perform communication in real time without a loss of high-quality traffic. In addition, although a switch without a scheduling function is installed in a base station, a communication resource of the base station can be properly utilized, and thus an access network can be effectively established at a low cost.

The embodiments of the present invention may not necessarily be implemented only through the foregoing apparatus and/or method described above, but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A scheduling method comprising:
   obtaining a session identifier from a header of an input packet and storing the packet in a packet memory;
   calculating a packet start time of the packet;
   selecting a slot corresponding to the packet start time from a scheduling including a plurality of slots, wherein the packet start time is when the packet is read;
   determining whether to store the session identifier of the input packet in the selected slot in consideration of the number of session identifiers already stored in the selected slot and the number of session identifiers representing virtual ports corresponding to the input packet, the virtual port being an output port of a switch device which is connected to the outside and does not have a scheduling function; and
   when the session identifier is determined to be stored with respect to the selected slot, storing the session identifier in the selected slot, and when the start time of the packet arrives, reading the packet stored in the packet memory by using the stored session identifier and outputting the packet stored in the packet memory,
   wherein the outputting of the packet stored in the packet memory comprises:
   designating a slot in which the session identifier of a packet to be started at a current time is stored, as a current slot;
   checking whether or not a session identifier is stored in the current slot, a previous slot of the current slot, and a previous slot of the previous slot in the scheduler;
   when there is a session identifier in the current slot, a previous slot of the current slot, and a previous slot of the previous slot, selecting the session identifier of a packet to be output based on a weight given to buffers included in respective slots, and outputting the selected session identifier; and
   reading a corresponding packet stored in the packet memory by using the session identifier and outputting the packet.

2. The method of claim 1, wherein the storing of the packet comprises:
   reading the corresponding session identifier present in the head of the input packet;
   obtaining a characteristic parameter corresponding to the session identifier; and
   storing the packet in the packet memory by using the characteristic parameter.

3. The method of claim 2, wherein the characteristic parameter is an element that comprises a service bandwidth as an allowable bandwidth of a session, a service type, the number of packets indicating the number of packets corresponding to the session has passed, a number of an output port in which a packet is transferred, a virtual port number as a number of a next output port in which a packet is further to be transferred, and a session start address and a session end address of a packet memory in which packets corresponding to the session are stored in a linked list manner.

4. The method of claim 2, wherein the storing of the packet in the packet memory comprises
   storing of the input packet in the packet memory based on a session start address and a session end address of the packet memory included in the characteristic parameter.

5. The method of claim 1, wherein the calculating of the packet start time comprises
   calculating a start time of the packet based on a bandwidth of session and a service type item of a characteristic parameter.

6. The method of claim 1, wherein, in the determining, whether to store the session identifier of the input packet in the selected slot is determined in consideration of a counter value of a first packet counter indicating the number of session identifiers stored in the slot and a counter value of a second packet counter indicating the number of session identifiers corresponding to virtual ports corresponding to the input packet among session identifiers stored in the slot.

7. The method of claim 6, wherein the determining comprises:
   updating the counter value of the first packet counter;
   comparing the updated counter value of the first packet counter with a first maximum value previously set with respect to the slot; and
   when the updated counter value of the first packet counter is smaller than the first maximum value, storing the session identifier of the input packet in the selected slot.

8. The method of claim 7, wherein the determining further comprises,
   when the updated counter value of the first packet counter is greater than the first maximum value, returning the updated counter value of the first packet counter to a previous value before being updated, and selecting a slot corresponding to a next turn from among the slots of the scheduler.

9. The method of claim 7, wherein the determining to store the session identifier comprises:
   updating the counter value of the second packet counter;
   comparing the updated counter value of the second packet counter with a pre-set second maximum value with respect to the virtual ports; and
   when the updated counter value of the second packet counter is smaller than the second maximum value, storing the session identifier of the input packet in the selected slot.

10. The method of claim 9, wherein the determining to store the session identifier further comprises,
    when the updated counter value of the second packet counter is greater than the second maximum value, returning the updated counter value of the second packet counter to a previous value before being updated, and selecting a slot corresponding to a next turn from among the slots of the scheduler.

11. The method of claim 9, wherein the second maximum value is determined based on a bandwidth of the virtual port.

12. The method of claim 1, wherein, in the outputting of the selected session identifier, the session identifier of the packet to be output is selected according to a weighted round robin (WRR) based on weights given to the buffers.

13. A scheduling apparatus comprising:
    a packet memory configured to store a packet;
    a packet session controller configured to store the input packet in the packet memory by using a session identifier included in a header of the input packet and calculate a start time of the packet;
    a session table configured to store characteristic parameters according to sessions;
    a scheduling unit including a plurality of slots and performing scheduling to selectively store a session identifier of a slot corresponding to a packet start time in consideration of the number of session identifiers stored in the slot and the number of session identifiers representing virtual ports corresponding to an input packet, the virtual port being an output port of a switch device which is connected to the outside and does not have a scheduling function,
    wherein the packet start time is when an output buffer begins to read the packet, and
    wherein when session identifiers are stored in respective buffers of a current slot as a slot in which a session identifier of a packet to be started at a current time is stored, a previous slot of the current slot, and a previous slot of the previous slot, the scheduling unit may select a session identifier to be output based on weights given to the buffers included in the respective slots and output the selected session identifier; and
    an output buffer unit reading a packet corresponding to the session identifier stored in the slot corresponding to the packet start time from a packet memory and outputting the same.

14. The apparatus of claim 13, wherein each of the slots comprises:
    a first packet counter indicating the number of packets stored in each slot;
    a second packet counter indicating the number of packets corresponding to each virtual port; and
    a plurality of buffers storing a corresponding session identifier according to each service type,
    wherein the plurality of buffers may be given a different weight according to a service type.

15. The apparatus of claim 13, wherein the scheduling unit updates a counter value of the first packet counter corresponding to the slot corresponding to the packet start time, and when the updated counter value is smaller than a first maximum value previously set with respect to the slot, the scheduling unit stores the session identifier of the packet in the slot.

16. The apparatus of claim 15, wherein the scheduling unit may update a counter value of the second packet counter corresponding to the slot corresponding to the packet start time, and when the updated counter value is smaller than a second maximum value previously set based on a bandwidth of the virtual port, the scheduling unit may store the session identifier of the packet in the slot.

17. The apparatus of claim 16, wherein when the updated counter value of the first packet counter is greater than the first maximum value or when the updated counter value of the second packet counter is greater than the second maximum value, the scheduling unit may return the updated counter value to a previous value before being updated and select a slot corresponding to a next turn from among the plurality of slots.

18. The apparatus of claim 14, wherein the output buffer unit comprises a plurality of buffers, and
    the plurality of buffers are discriminated according to service types and are given weights according to service types, and
    when one of a plurality of buffers is selected and a session identifier stored therein is output, a corresponding packet is read from the packet memory by using the session identifier, and a packet may be finally output.

* * * * *